United States Patent [19]

Tateda et al.

[11] Patent Number: 5,303,318
[45] Date of Patent: Apr. 12, 1994

[54] HIGH POWER ACCEPTABLE OPTICAL FIBER AND FABRICATION METHOD THEREOF

[75] Inventors: Mitsuhiro Tateda; Masaharu Ohashi, both of Mito; Katsusuke Tajima, Katsuta; Kazuyuki Shiraki, Mito, all of Japan

[73] Assignee: Nippon Telegraph & Telephone Corporation, Tokyo, Japan

[21] Appl. No.: 967,816

[22] Filed: Oct. 27, 1992

[30] Foreign Application Priority Data

Nov. 1, 1991 [JP] Japan .................................. 3-287643
Sep. 25, 1992 [JP] Japan .................................. 4-256975

[51] Int. Cl.[5] .............................................. G02B 6/16
[52] U.S. Cl. ................................... 385/123; 385/124; 65/3.11; 65/3.12
[58] Field of Search ............................ 385/123–128, 385/142; 65/DIG. 16, 3.11, 3.12

[56] References Cited

U.S. PATENT DOCUMENTS

| 4,053,204 | 10/1977 | Miller ................................. 385/124 |
| 4,053,205 | 10/1977 | Miller ................................. 385/124 |
| 4,344,670 | 8/1982 | Blankenship ..................... 385/124 X |
| 4,691,990 | 9/1987 | Cohen et al. ....................... 385/127 |
| 4,988,162 | 1/1991 | Hayami ............................ 385/142 X |
| 5,145,507 | 9/1992 | Kyoto et al. ................. 65/DIG. 16 |
| 5,170,457 | 12/1992 | Jen ....................................... 385/123 |

FOREIGN PATENT DOCUMENTS

| 0099632 | 2/1984 | European Pat. Off. . |
| 0175067 | 3/1986 | European Pat. Off. . |
| 56-009236 | 1/1981 | Japan . |
| 57-115042 | 7/1982 | Japan . |

OTHER PUBLICATIONS

Electronics Letters, vol. 18, No. 12; Jun. 1982; pp. 495 and 496.
Integrated Optics and Optical Fiber Communication (IOCC) Jul. 1989; Tensile Strain Effects on Brillouin Frequency Shift in Single-Mode Fibers Having Pure Silica and $GeO_2$-Doped Cores; Kurashima et al.
Electronics Letters, vol. 27, No. 12; Jun. 1991; pp. 1100–1101.
Proceedings of the 1991 IEICE Fall Conference B-546; Sep. 1991; Suppression of Stimulated Brillouin Scattering by Intentionally Induced Residual-Strain in Single-Mode Optical Fibers.
ECOC '91; Suppression of Stimulated Brillouin Scattering by Intentionally Induced Periodical Residual-Strain in Single-Mode Optical Fibers; Wada et al no month.
The Transactions of The Institute of Electronics and Communication Engineers of Japan, vol. J66-B, No. 7; Jul. 1983; pp. 829–836.
ECOC '88; Brillouin-Gain Spectra for Single-Mode Fibers Having Various Core/Cladding Material Compositions; Shibata et al; pp. 115–118 Sep. 1988.
Soviet Journal of Quantum Electronics, vol. 20, No. 7, Jul. 1990, New York, U.S., pp. 731–732 (Abramov et al).

Primary Examiner—John D. Lee
Assistant Examiner—Phan T. Heartney
Attorney, Agent, or Firm—Frishauf, Holtz, Goodman & Woodward

[57] ABSTRACT

A high-power acceptable optical fiber comprises a core and cladding provided on the outer peripheral surface of the core. The dopant concentrations in the core and cladding each change in the axial direction of the optical fiber. The core has a same relative refractive index profile in any cross section thereof taken in a direction perpendicular to the axial direction thereof. The relative refractive index profile is normalized by a maximum refractive index of the core.

6 Claims, 8 Drawing Sheets

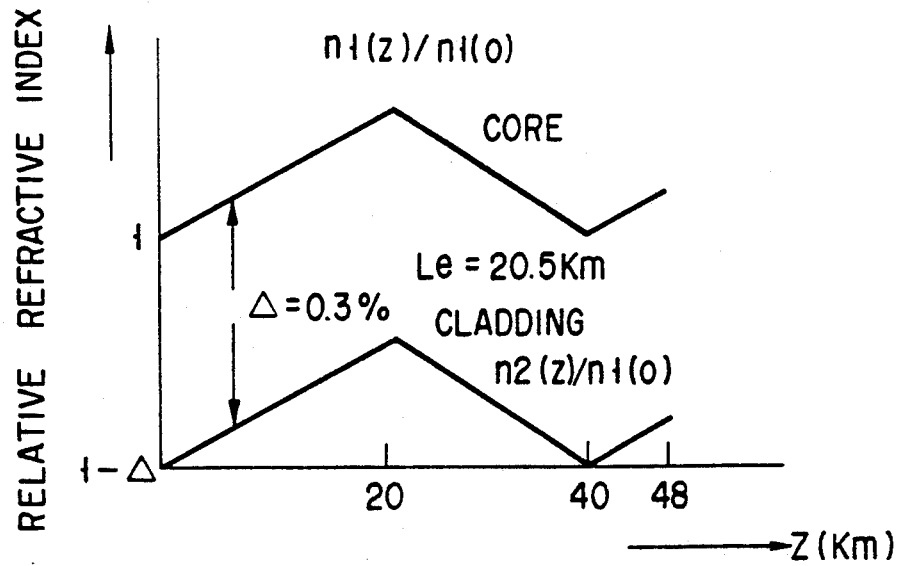
F I G. 3

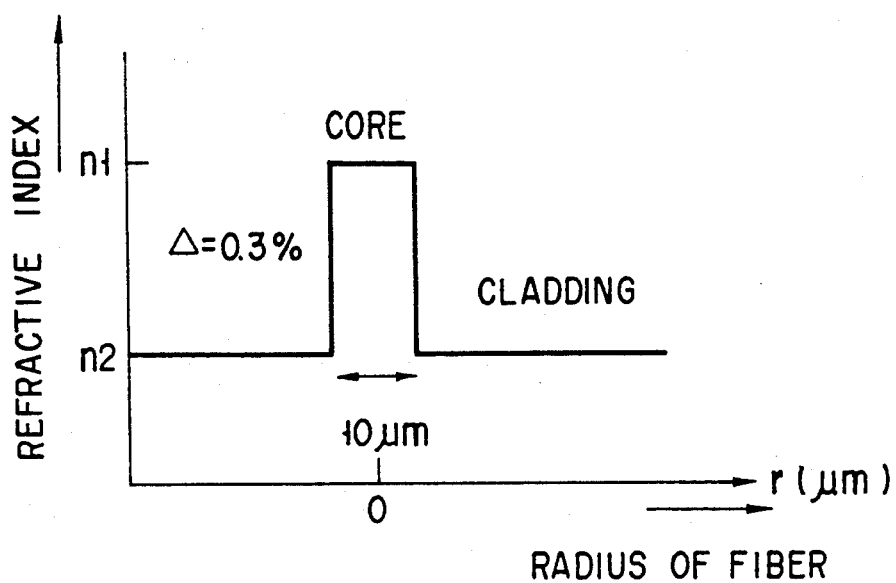
F I G. 4
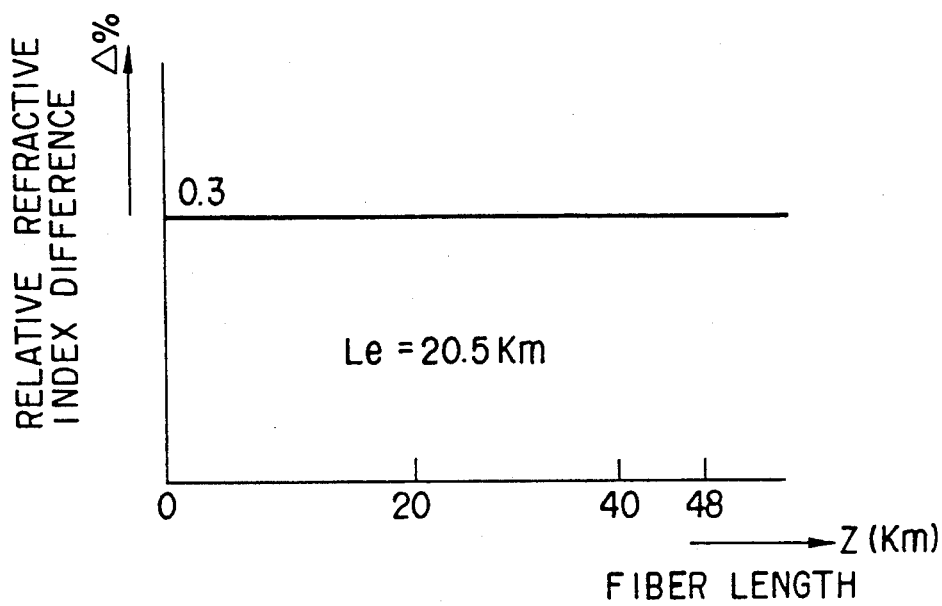
F I G. 5

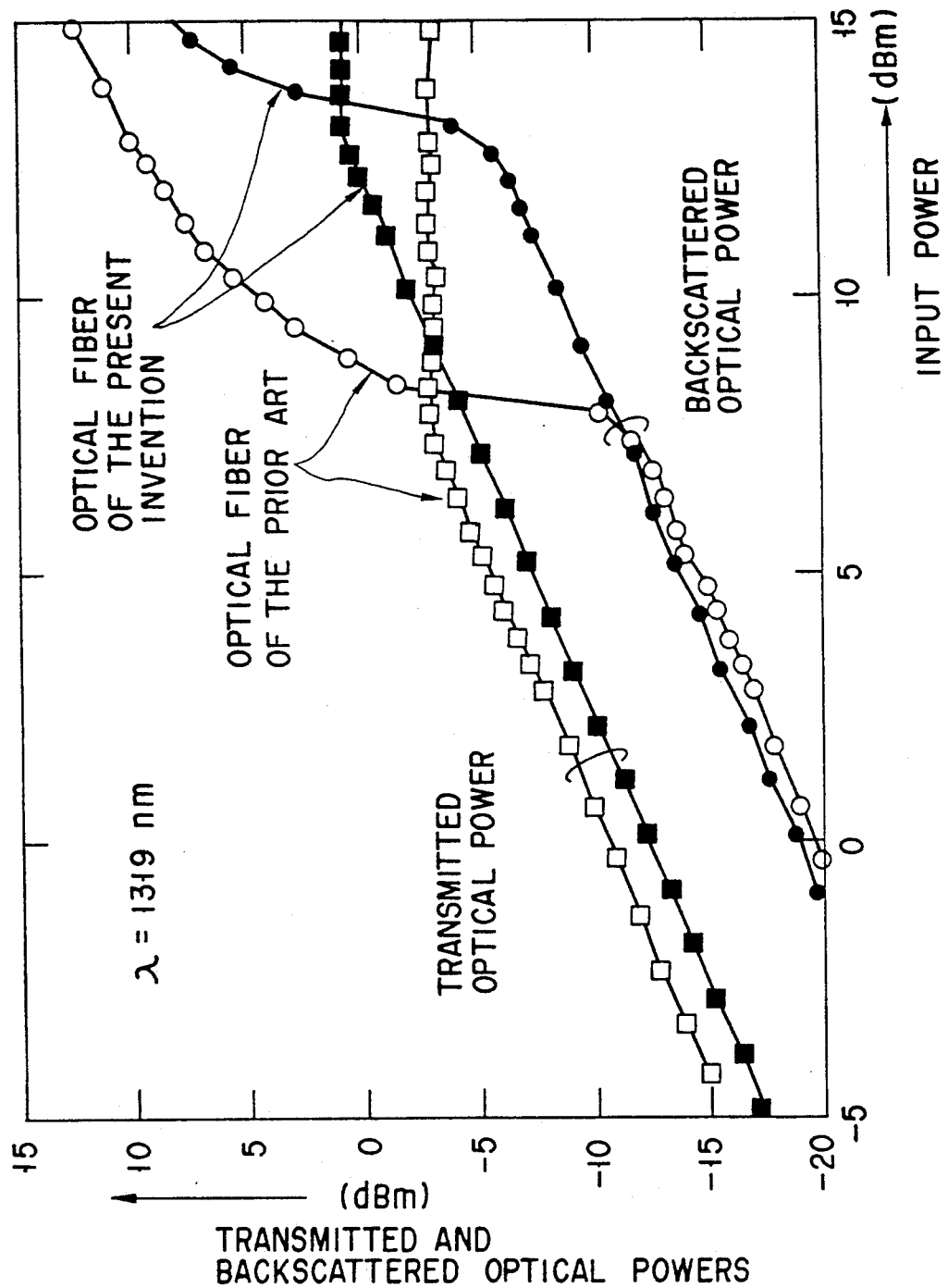
F I G. 12

HIGH POWER ACCEPTABLE OPTICAL FIBER AND FABRICATION METHOD THEREOF

BACKGROUND OF THE INVENTION

1. Field of the Invention

This invention relates to a high-power acceptable optical fiber and a method for fabricating the optical fiber.

2. Description of the Related Art

To accomplish super-long-distance optical transmission by using an optical fiber, it is necessary not only to reduce transmission loss of the optical fiber, but also to increase the intensity of signal light launched to the optical fiber.

As regards decreases in the transmission loss of an optical fiber, practical studies are being conducted. At present, in the case of optical fibers having $GeO_2$-doped silica cores, a fiber with a low transmission loss of 0.2 dB/km or less has been developed, while in the case of optical fibers having silica core and F-doped silica cladding, a fiber with a low transmission loss of 0.18 dB/km or less has been developed.

As regards increases in the intensity of light input to optical fibers, there have been significant advances in techniques, for example, the output-enhanced semiconductor laser and the erbium-doped optical fiber amplifier. However, it is known that the intensity of light which can be launched into an optical fiber is limited. If too intensive light of, for example, about 7 dBm or more is launched to an optical fiber, non-linear optical phenomenon will occur in which acoustic waves will be created in the fiber and will scatter lightwaves. Due to this phenomenon, known as "stimulated Brillouin scattering", most of the input light is reflected toward the light-input end of the fiber, not reaching the light-receiving end of the fiber. The phenomenon is explained in D. Cotter, "Observation of Stimulated Brillouin Scattering in Low-Loss Silica Fiber at 1.3 $\mu m$" (Electronics Letters, vol. 18, No. 12, pages 495–496, 1982).

As is explained above, the amount of light which can be launched into an optical fiber is limited. To increase the transmission distance, it is necessary to suppress the stimulated Brillouin scattering. To suppress the scattering, it is necessary to increase the gain bandwidth of the stimulated Brillouin scattering spectrum, i.e., to cause nonuniform Brillouin frequency shift (the difference between the frequency of the input light and that of the scattered light).

A method for causing strain in an optical fiber is reported as a conventional technique for suppressing stimulated Brillouin scattering. This method utilizes the fact that application of strain to the optical fiber changes the Brillouin frequency shift.

This fact is disclosed in Kurashima Horiguchi, and Tateda, "Tensile Strain Effects on Brillouin Frequency Shift in Single-Mode Fibers Having Pure Silica and $GeO_2$-doped Cores" (IOOC' 89, 21C4-2). Further, as a method for utilizing the fact to increase the threshold value for the amount of light input to an optical fiber, over which the stimulated Brillouin scattering will occur, a technique for enlarging the gain bandwidth of the Brillouin scattering spectrum is reported in N. Yoshizawa, T. Horiguchi, T. Kurashima, "Proposal for Stimulated Brillouin Scattering Suppression by Fiber Cabling" (Electronics Letters, Vol. 27, No. 12, pages 1100–1101, 1991). In the method, optical fibers are helically stranded in a cable so as to change the strain caused in the axial direction of the fibers.

As is shown in FIG. 1, for example, the above-reported optical fiber cable employs optical fibers 11 of a double helix structure, extending in the axial direction, and the strain applied to the fibers 11 alternately changes from compressive strain to tensile strain, and vice versa. Thus, the Brillouin frequency shift varies in different portions of the fibers, increasing the gain bandwidth of the Brillouin scattering spectrum. Consequently, the threshold value for the amount of light increases, over which the stimulated Brillouin scattering will occur.

Moreover, a method for changing a residual stress in the axial direction of an optical fiber by changing the tension of the fiber during drawing the same is explained in Nozawa, Sakai, Wada, and Yamauchi, "Optical Fiber With Suppressed Stimulated Brillouin Scattering" (Proceedings of the 1991 of Institute of Electronics, Information and Communication Engineers of Japan Fall Conference, B-546). FIG. 2 shows an axial profile of tension on a Brillouin scattering-suppressed optical fiber consisting of a $SiO_2$ core and an F-doped $SiO_2$ cladding.

However, an optical fiber fabricated by the conventional methods for applying axial-directional strain to an optical fiber is liable to break. If the strain applied to a usual optical fiber increases from 0.1% to 0.2%, the factor of breakage per 1 km will become $10^7$ times higher. This is indicated in Yutaka Mitsunaga, Yutaka Katsuyama, Takakazu Kobayashi, Yukinori Ishida, "Method for Securing the Rigidity of Optical Fiber by Screening Test" (Transactions of the Institute of Electronics and Communication Engineers of Japan, Vol. J66-B, No. 7, 1983). To avoid such breakage, a technique for increasing the rigidity of an optical fiber by coating the fiber with a carbon film, must be employed in the conventional methods. In addition, since the optical fiber is kept in a particular strained state in the conventional method shown in FIG. 1, the cable structure is inevitably limited. It is therefore very difficult to employ the structure in the actual optical fiber line.

SUMMARY OF THE INVENTION

This invention has been made in consideration of the above circumstances, and the object thereof is to provide a high-power acceptable optical fiber for long-distance transmission which can reliably operate for a long period of time, and a method for fabricating the optical fiber.

According to an aspect of the invention, there is provided a high-power acceptable optical fiber comprising:

a core; and cladding provided on the outer peripheral surface of the core, and forming the optical fiber together with the core, the concentrations of a dopant/dopants doped in the core and cladding changing in a direction of an axis of the optical fiber, respectively, the core having a same relative refractive index profile in any cross section thereof taken in a direction perpendicular to a direction of an axis thereof, the relative refractive index profile being normalized by a maximum refractive index of the core.

According to another aspect of the invention, there is provided a method of fabricating a high-power acceptable optical fiber comprising:

the step of forming a preform of an optical fiber; and the step of drawing the optical fiber from the preform;

said preform-forming step including the step of forming a silica glass soot and the step of consolidating the silica glass soot into a transparent glass in a furnace.

In the high-power acceptable optical fiber of the invention and the method of fabricating the optical fiber, the fact that the stimulated Brillouin frequency shift depends on the dopant concentration in the fiber preform is utilized. The threshold value at which the stimulated Brillouin scattering will occur can be increased by changing the dopant concentration in the axial direction of the fiber, in a state in which the relative refractive index profile, which is normalized by the maximum refractive index of the core, is kept same in any cross section of the fiber perpendicular to the axial direction thereof. As a result, the amount of light which can be launched to the fiber can be increased, and hence the transmission distance can be considerably increased.

Further, since no strain is applied to the high-power acceptable optical fiber of the invention, the fiber can be used in a reliable manner for a long period of time.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a graph, showing the relative refractive indices of the core and cladding at a length z of a high-power acceptable optical fiber according to a first embodiment of the invention;

FIG. 4 shows a refractive index profile in a cross section of the high-power acceptable optical fiber of the first embodiment;

FIG. 5 shows an axial profile of the relative refractive index difference $\Delta$ between the core and cladding of the high-power acceptable optical fiber of the first embodiment;

FIG. 12 is a graph, useful in comparing the relationship between transmitted-light and backscattered-light powers and an input-light power in the invention, with the relationship therebetween in the conventional case.

DETAILED DESCRIPTION OF THE PREFERRED EMBODIMENTS

The invention will be explained with reference to the accompanying drawings showing embodiments thereof.

FIG. 3 shows axial variations in the refractive indices of the core and cladding of an optical fiber according to a first embodiment. In this embodiment, the index profile has a stepwise shape, and $GeO_2$ is used as a dopant in both the core and cladding.

The cladding of an end (z=0) portion of the optical fiber of the first embodiment contains no dopant, and has the same structure as a usual optical fiber.

In FIGS. 3, and 5-7, reference sign Le denotes an effective length along which stimulated Brillouin scattering will occur. The aforementioned Cotter's paper describes that the effective length is approximately $4.3/\alpha$ ($\alpha$:loss (dB/km)) where the length of the optical fiber is sufficiently long. When the optical loss of the optical fiber is 0.21 dB/km, the effective length Le is 20.5 km. Though Brillouin scattering is liable to occur due to interaction of acoustic waves and light-waves over the entire effective length Le, the threshold value of the Brillouin scattering can be increased by varying the dopant concentration in the fiber over the entire effective length Le. FIG. 4 shows a refractive index profile in a cross section at a given length z of the fiber. The diameters of the core and cladding are uniformly set at 10 $\mu$m and 125 $\mu$m, respectively, through the entire fiber length, and the relative refractive index difference $\Delta$ ($=(n_1-n_2)/n_1$; $n_1$:the refractive index of the core, $n_2$:the refractive index of the cladding) is uniformly set at 0.3%, as is shown in FIG. 5.

Figure 1:
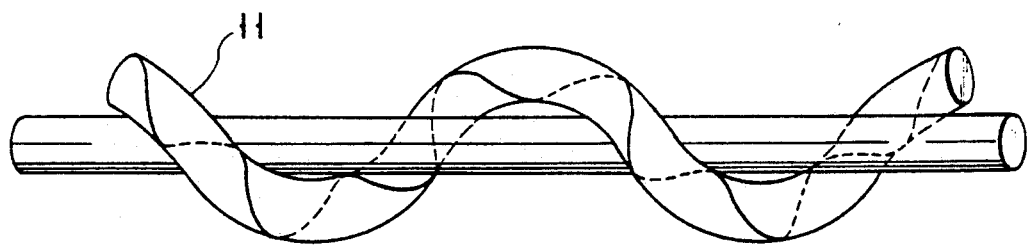
FIG. 1 is a view, showing conventional optical fibers of a double helix structure for suppressing the Brillouin scattering.
Figure 2:
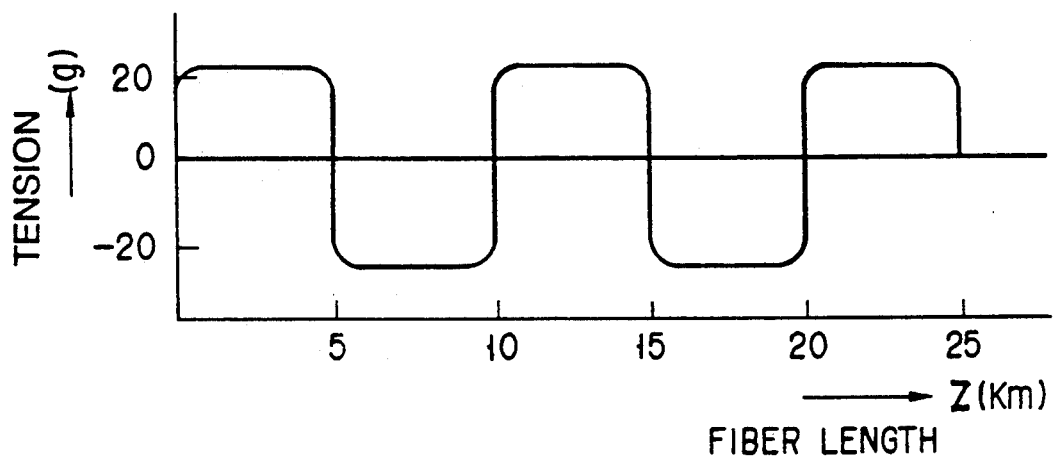
FIG. 2 is a graph of a tension profile, showing a conventional case where the tension of the optical fibers is varied in its axial direction so as to cause residual stress during fiber drawing and suppress the Brillouin scattering.
Figure 6:
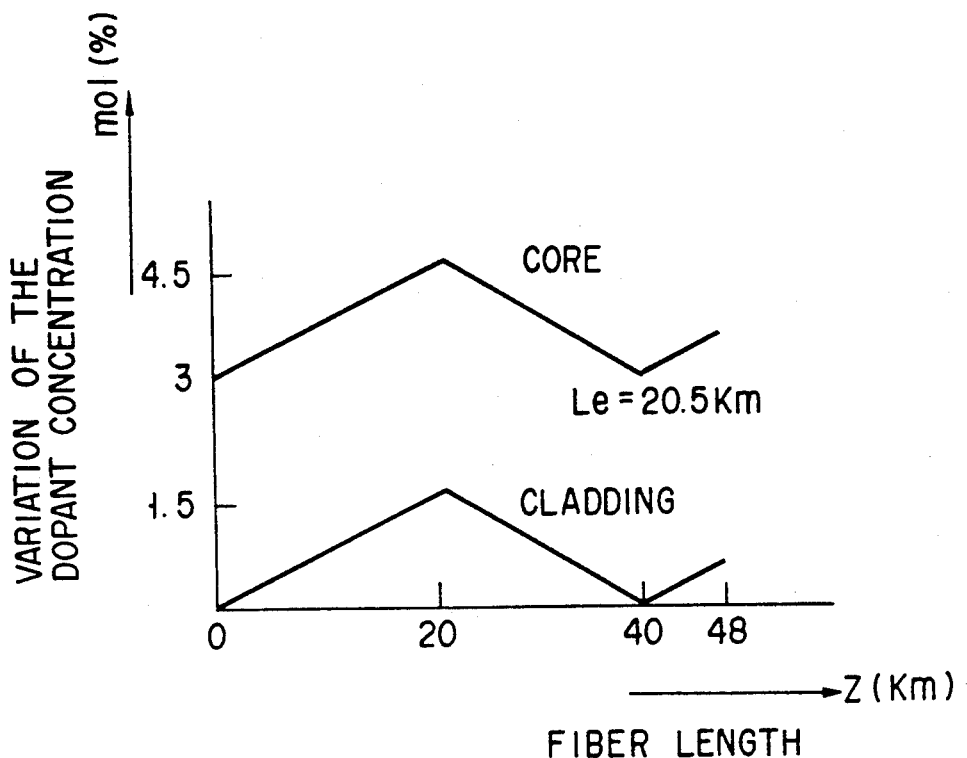
FIG. 6 shows axial variations in the amounts of $GeO_2$ doped in the core and cladding of the high-power acceptable optical fiber of the first embodiment.

FIG. 6 shows a dopant-concentration profile for realizing the above-described fiber structure, which are taken in the axial direction of the optical fiber. As is shown in this figure, if $GeO_2$ is used as a dopant, 1 mol %-$GeO_2$ doping increases the refractive index of $GeO_2$-doped $SiO_2$ relative to undoped $SiO_2$ by about 0.1%.

In the optical fiber shown in FIG. 5, the amount of a dopant in the core is 3 mol % at z=0, and 4.5 mol % at z=20.5 km, while the amount of a dopant in the cladding is 0 mol % at z=0, and 1.5 mol % at z=20.5 km. The amount of the dopant is continuously varied such that the refractive index difference $\Delta$ between the core and cladding at a given length z is kept at 0.3%.

The optical fiber in the embodiment is designed such that the threshold value of the intensity of input light is ten times higher than that in a usual optical fiber. Specifically, it is reported in the paper written by N. Shibata, Y. Azuma, T. Horiguchi, and M. Tateda, "Brillouin-Gain Spectra for Single-Mode Fibers Having Various Core/Cladding Material Compositions" (ECOC '88), that the frequency shift of stimulated Brillouin scattering light varies in proportional to the amount of a dopant in the core. Further, Cotter describes that the gain bandwidth of the stimulated Brillouin scattering spectrum of silica is approx. 16 MHz for a 1.55 μm-wavelength light.

Accordingly, to increase the threshold value of an input by 10 dB, the stimulated Brillouin frequency shift must be varied by 160 (16×10) MHz. N. Shibata et al. describe that the frequency shift due to $GeO_2$ is 107 MHz/mol %.

Thus, it suffices if the concentration of $GeO_2$ of approx. 1.5 mol % is varied in the axial direction of the optical fiber over the entire effective length Le. Since the amount of doped $GeO_2$ is small, the optical loss of the optical fiber of the embodiment is larger by approx. 0.01 dB/km than a loss of 0.20 dB/km in the conventional optical fiber, that is, the optical loss of the fiber of the embodiment is approx. 0.21 dB/km. Thus, when the intensity of light is increased by 10 dB, a 48 km (=10/0.21) long optical fiber can be connected to the conventional optical fiber.

In this case, at that junction between the optical fiber of the invention and the conventional one which is located 48 km remote from the input end of the former fiber, the intensity of light is attenuated to a value equal to the input-light threshold value of the conventional fiber, so that there is no possibility of occurrence of the stimulated Brillouin scattering.

As is explained above, if a 48 km long optical fiber according to the embodiment is connected to the conventional optical fiber, and if light having an intensity (17 dBm) ten times higher than the input-light threshold value (7 dBm) of the usual optical fiber is launched to a light input end of the fiber of the embodiment, the intensity of light is equal to the input-light threshold value of the conventional fiber at the junction therebetween, thereby enabling the transmission length to be increased by 48 km.

Figure 7:
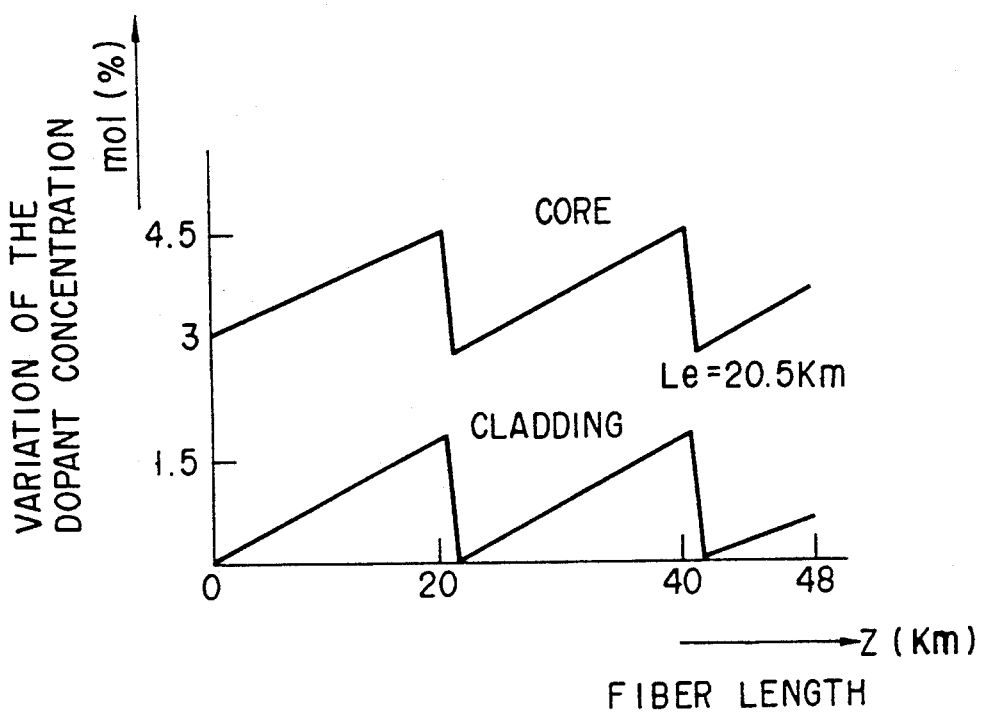
FIG. 7 shows axial variations in the amounts of $GeO_2$ doped in the core and cladding in the first embodiment, which differs from those in FIG. 6.

It is evident that an optical fiber with a dopant profile as shown in FIG. 7 can provide the same effect as that of the fiber with the dopant profile shown in FIG. 6. Further, on the same principle as the above, if in general, along the effective length Le, the amount of a dopant is varied in the axial direction of the fiber such that the Brillouin frequency shift is G-times (ten times in the above-described embodiment) or more larger than the gain bandwidth (16 MHz) of the Brillouin scattering spectrum of a usual optical fiber, the effect that the threshold value of the amount of input light becomes G-times higher can be obtained even though the index profile in a cross section has a shape other than a stepwise shape.

Figure 8:
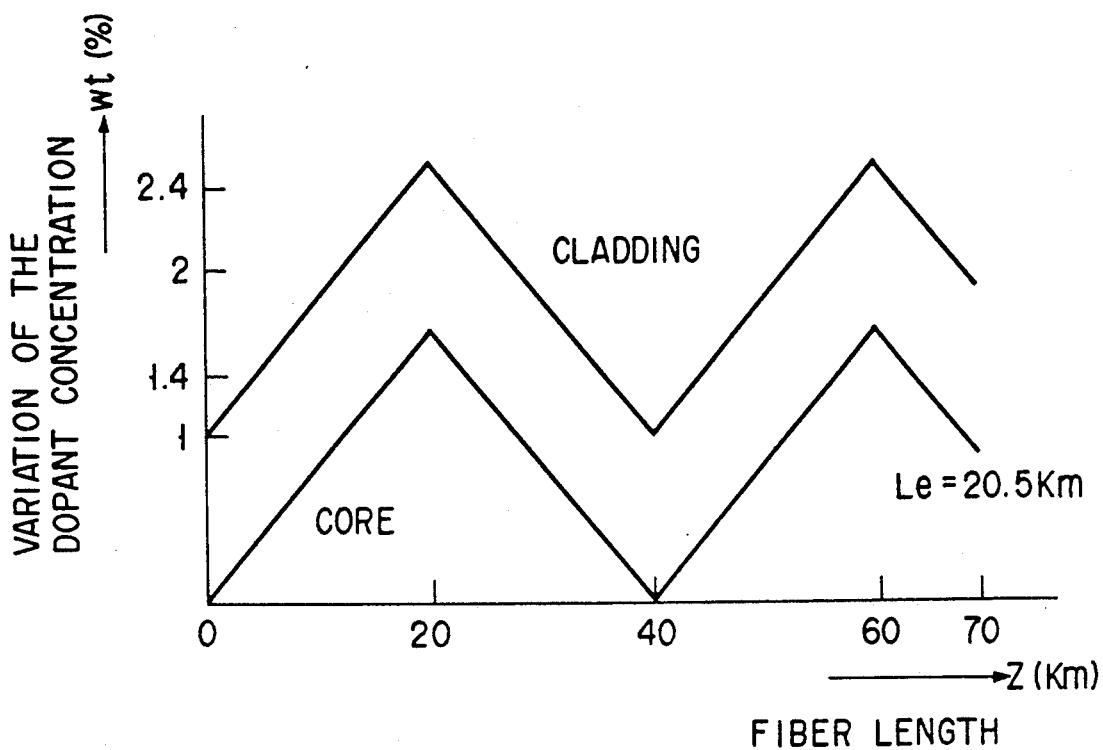
FIG. 8 shows axial variations in the amounts of fluorine (which is used as a dopant for controlling a waveguide structure, and hereinafter referred to as "F") doped in the core and cladding of a high-power acceptable optical fiber according to a second embodiment of the invention.
Figure 9:
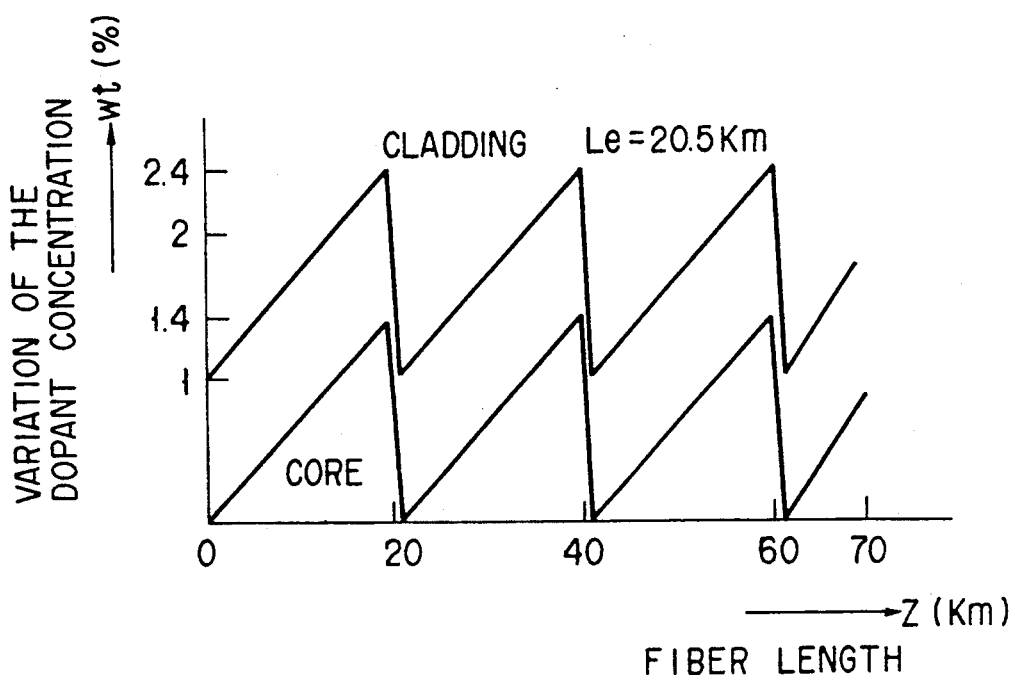
FIG. 9 shows axial variations in the amounts of F doped in the core and cladding in the second embodiment, which differ from those in FIG. 8.

A second embodiment of the invention in which F is used as a dopant for controlling a waveguide structure will be explained with reference to FIGS. 8 and 9. FIGS. 8 and 9 show axial variations in the dopant concentrations in the optical fiber of the second embodiment.

When $SiO_2$ is doped with F, the refractive index of the F-doped $SiO_2$ relative to $SiO_2$ decreases by 0.4% in units of 1 wt % of F. Accordingly, a waveguide structure can be formed by doping the cladding with F of an amount larger than that of F in the core. As in the first embodiment, the diameters of the core and cladding are set to 10 μm and 125 μm, respectively, and the relative refractive index difference Δ is set to 0.3%.

It is known from ECOC'88, pages 115-118 (N. Shibata et al.) that when a silica soot is heated in an atmosphere of F gas to be doped with 1 wt % F so as to form the core of an optical fiber, the Brillouin frequency shift will change by 356 MHz. As in the first embodiment, in order to increase the input level by 14.8 dB by changing the Brillouin frequency shift by a value 30 times larger than the gain bandwidth, i.e., by 480 MHz, approx. 1.35 wt % of F must be changed in the axial direction of the optical fiber. At this time, the relative refractive index difference Δ between the core and cladding is kept at 0.3%, i.e., the amount of change in F in the axial direction of the fiber is set to the same value between the core and cladding.

The optical loss of an optical fiber with a pure silica core and an F-doped cladding is about 0.18 dB/km. If this optical fiber is further doped with F of 1.35 wt % at maximum in the axial direction, the average optical loss is about 0.21 dB/km due to an increase in Rayleigh scattering. Accordingly, if a 70 (=14.8/0.21) km long optical fiber according to the second embodiment is connected to the conventional optical fiber, and light of 21.8 dBm is input to an end of the fiber of the second embodiment, the intensity of the light becomes, at the light-input end of the conventional fiber, 7 dBm which is a limit value over which the light will be reflected therein. Accordingly, the transmission length can be enlarged by 70 km.

Since in the first and second embodiments, the refractive index of the light-output end of the optical fiber is made equal to that of the conventional optical fiber, there will not occur such an adverse effect as reflection of light at the junction between the fibers. Moreover, since the optical fiber of the invention has no strain, it can provide a more reliable long-distance light transmission line than the conventional strain-applied optical fiber.

Combinations of dopants employed in the high-power acceptable optical fiber of the invention are specifically as follows, including those employed in the first and second embodiments:

(1) The case of using $GeO_2$-doped silica as the material of the core and cladding of the optical fiber;

(2) The case of using $GeO_2$-doped silica as the material of the core and cladding of the soot preform of the optical fiber, and then doping the core and cladding with F in the process of consolidating the preform soot into a transparent glass;

(3) The case of using $GeO_2$-doped silica as the material of the core of the soot preform of the fiber and pure-silica as the material of the cladding of the same, and then doping the core and cladding with F in the process of consolidating the preform soot into a transparent glass;

(4) The case of using F-doped silica as the material of the core and cladding of the optical fiber.

Though in the above embodiments, $GeO_2$ and F are used as dopants, the same effect as in the embodiments can be obtained even when $Al_2O_3$, $P_2O_5$, etc., are used as dopants. The same effect also can be obtained when the structure of the invention is applied to optical fibers of particular structures such as a dispersion-shifted optical fiber and a polarization-maintaining optical fiber.

Figure 10:
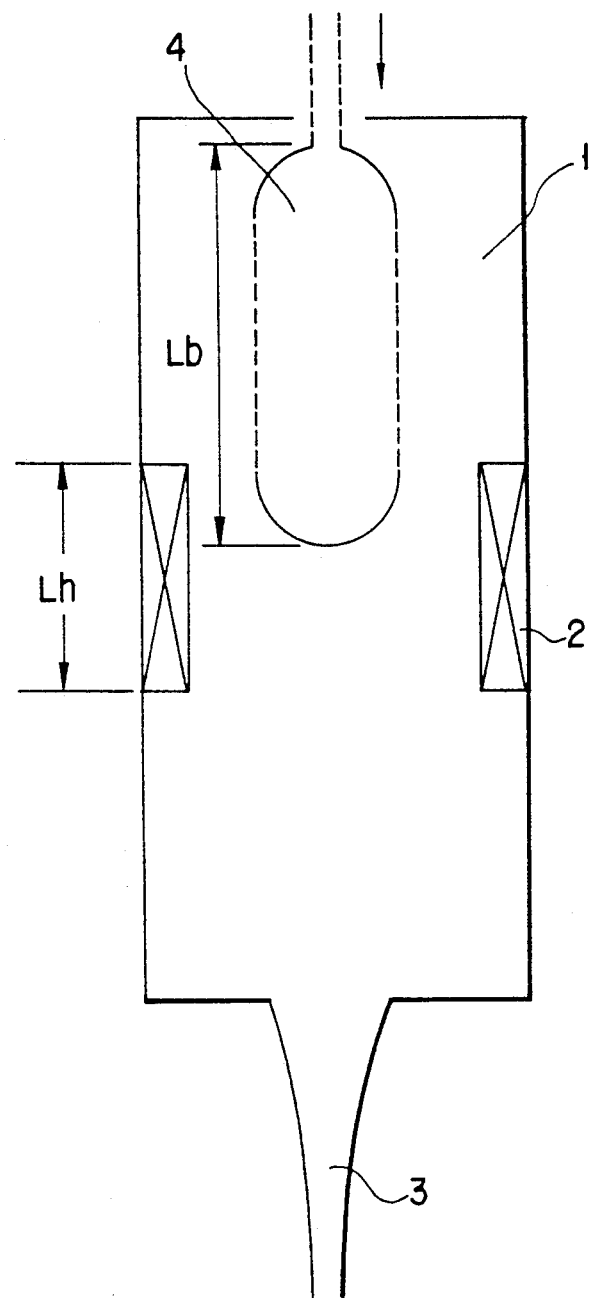
FIG. 10 is a schematic diagram, showing the internal structure of a furnace for consolidation or sintering, which is used in the process of fabricating an optical fiber preform employed in a high-power acceptable optical fiber fabrication method according to the invention.

Then, an embodiment directed to a method for fabricating the high-power acceptable optical fiber will be explained. A soot fabricated by a VAD method and consisting of a $GeO_2$-doped silica core and silica cladding was heated and consolidated into a transparent glass. This consolidation was performed in a zone furnace in the atmosphere of F. The soot was gradually moved downward at a constant speed in the zone furnace for consolidation shown in FIG. 10, into which SF$_6$ and He gases were supplied. When the soot reached a heater unit 2 in the furnace, the concentration of F doped in the soot was fixed, thereby consolidating the preform into a transparent glass. The concentration of F can be varied in the longitudinal direction of the preform thereof by temporally varying the amount of the supplied gases in the atmosphere.

Figure 11:
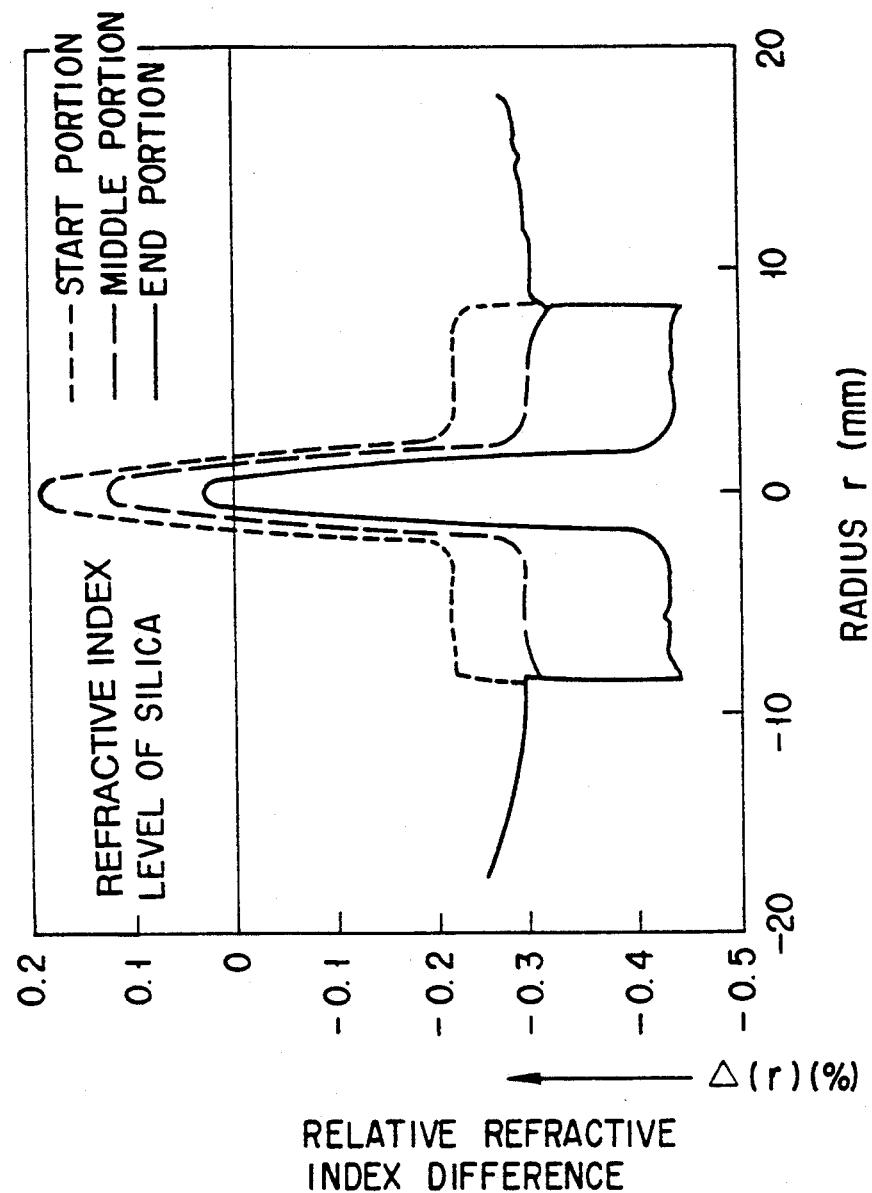
FIG. 11 shows longitudinal variations in the relative refractive index profiles of the optical fiber preform.

FIG. 11 shows an example of a refractive index profile in the longitudinal direction of the preform of the high-power acceptable optical fiber of the invention. The length of a sample of optical fiber is about 29 km. As is evident from the figure, the amount of F doped in the fiber is varied in the longitudinal direction by a value corresponding to a relative refractive index difference of about 0.2%, while the relative refractive index difference between the core and cladding of any portion of the fiber in the longitudinal direction is kept constant. In the case of forming an F-doped silica glass, the refractive index of the glass relative to SiO$_2$ decreases by 0.4% in units of 1 wt % of F. Thus, in this case, the amount of doped F varies by about 0.5 wt % between the light-input end of the fiber (i.e., start portion in FIG. 11) and the light-output end (i.e., end portion). The optical loss of the optical fiber in the example is 0.43 dB/km and 0.23 dB/km at 1.3 $\mu$m and 1.55 $\mu$m, respectively, and is substantially equal to that of a usual optical fiber.

On the other hand, it is known that when the core of the optical fiber is doped with F serving as a dopant whose amount is variable, the Brillouin frequency shift changes by 356 MHz in units of 1 wt % of F for a 1.55 $\mu$m-wavelength light. This means that it will change by 424 MHz for a 1.3 $\mu$m-wavelength light.

FIG. 12 shows measurement results indicating the relationship between the input power of light with a wavelength of 1.3 $\mu$m, the transmitted-light power, and the scattered-light power. As is shown in the figure, the threshold value of the input power in the optical fiber of the invention, over which the amount of the scattered light due to the stimulated Brillouin scattering abruptly increases, is about 13 dBm, whereas the threshold value of the input power in the conventional optical fiber is about 7 dBm. That is, the fiber of the invention is enhanced by about 6 dB, as compared with the conventional one.

As described above, the threshold value of the amount of input light can be enhanced by varying the amount of F doped in the optical fiber in the longitudinal direction thereof.

Figure 13:
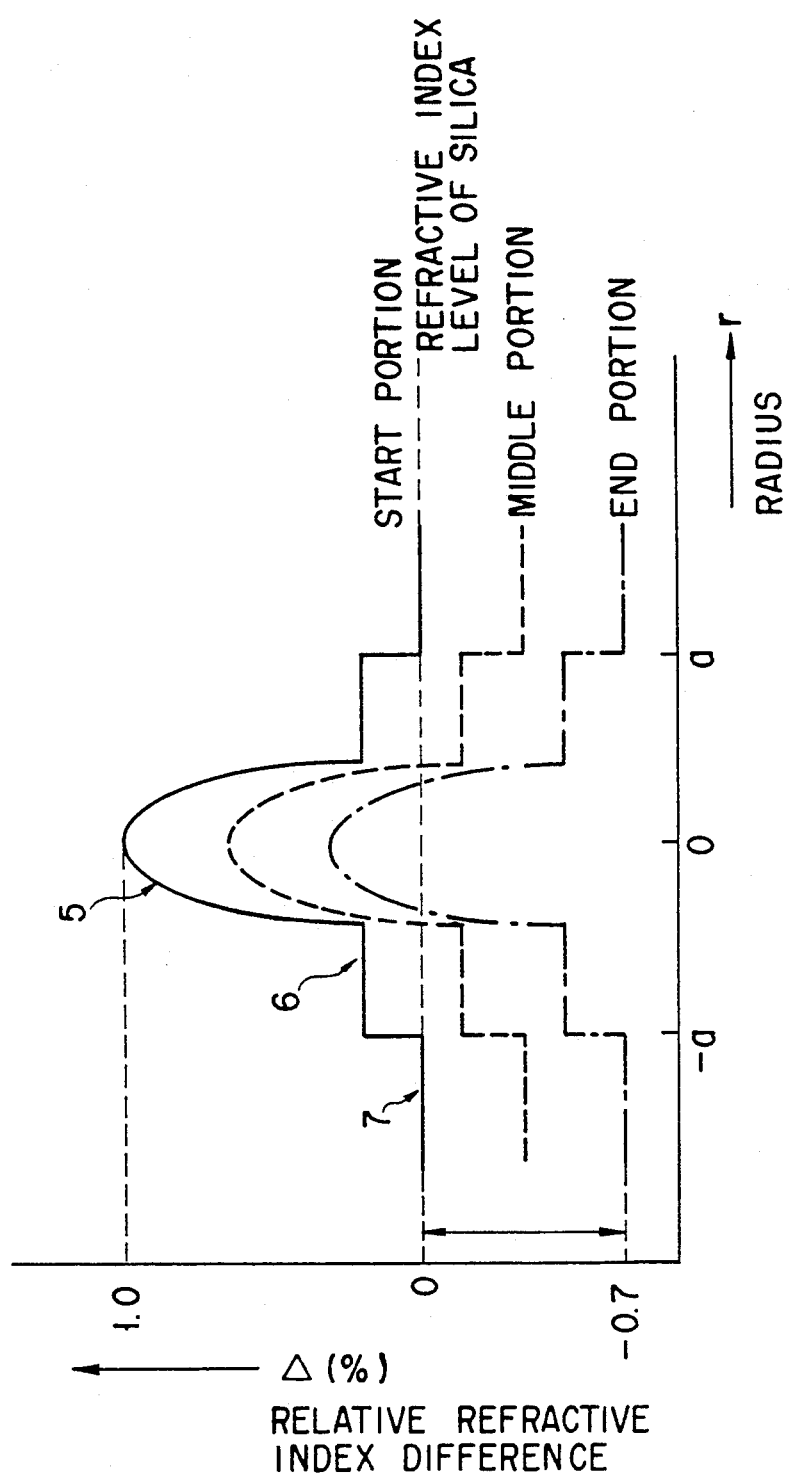
FIG. 13 shows refractive index profiles of a dispersion-shifted high power-acceptable optical fiber with a three-layered structure.

FIG. 13 shows an embodiment, in which the invention is applied to a dispersion-shifted optical fiber with a three-layered structure. At the time of fabricating the optical fiber of this embodiment, a silica glass soot for forming a GeO$_2$-doped central core 5 and a GeO$_2$-doped side core 6, and a silica glass soot for forming undoped cladding 7 are formed by the VAD method. Thereafter, these soots are consolidated into glass in the furnace 1 shown in FIG. 10, while the concentration of F in the atmosphere is being varied. FIG. 13 shows the refractive index profiles of the glass preform thus obtained, in which the solid and one-dot lines indicate the refractive index profiles of the both opposite ends of the preform, respectively, and the broken line indicates the refractive index profile of a middle portion of the preform. When the refractive index changes by 0.7% due to a change in the amount of F in the longitudinal direction, the Brillouin frequency shift is about 300 MHz for a 1.3 $\mu$m-wavelength light. The suppression factor of the stimulated Brillouin scattering is about 8 dB since the gain bandwidth of the Brillouin scattering spectrum in a usual optical fiber is 50 MHz. As is evident from the above, the refractive index profile of the optical fiber of the invention is not limited to the stepwise shape, but may have any desired shape.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of fabricating a high-power acceptable optical fiber comprising the steps of:

forming a preform of an optical fiber; and drawing the optical fiber from the preform;

said preform-forming step including forming a silica glass soot and consolidating the silica glass soot into a transparent glass in a furnace, wherein said silica glass soot-forming step includes forming a silica glass soot by a vapor-phase axial deposition method, and said consolidating step includes heating the silica soot in the furnace while the concentration of F in the atmosphere is temporarily changed, so as to longitudinally change the amount of F doped into the soot.

2. A high-power acceptable optical fiber comprising:

a core; and cladding provided on the outer peripheral surface of the core, and forming the optical fiber together with the core, the concentrations of a dopant/dopants doped in the core and cladding changing in a direction of an axis of the optical fiber, respectively, the core having a same relative refractive index profile in any cross section thereof taken in a direction perpendicular to a direction of an axis thereof, the relative refractive index profile being normalized by the maximum refractive index of the core.

3. The high-power acceptable optical fiber according to claim 2, wherein the core and cladding are made of F-doped silica, and the amount of the dopant doped in the core differs from that of the dopant doped in the cladding, and the difference between the amounts is constant.

4. The high-power acceptable optical fiber according to claim 2, wherein the core and cladding are made of GeO$_2$-doped silica, and the concentration of the dopant changes in a direction of an axis of the optical fiber.

5. The high-power acceptable optical fiber according to claim 2, wherein the core and cladding are formed by doping a GeO$_2$-doped silica glass soot with F serving as a dopant whose amount is longitudinally variable.

6. The high-power acceptable optical fiber according to claim 2, wherein the core and cladding are made of GeO$_2$-doped silica and pure silica, respectively, and are doped with F serving as a dopant whose amount is longitudinally variable.

* * * * *